United States Patent [19]

Ganguli et al.

[11] 4,348,506

[45] Sep. 7, 1982

[54] PROCESS FOR CURING VINYL ESTER RESINS AND COMPOSITION USEFUL THEREIN

[75] Inventors: Kalyan K. Ganguli, Broken Arrow, Okla.; David A. Wilson, Richwood, Tex.

[73] Assignee: The Dow Chemical Company, Midland, Mich.

[21] Appl. No.: 226,343

[22] Filed: Jan. 19, 1981

Related U.S. Application Data

[63] Continuation-in-part of Ser. No. 64,235, Aug. 6, 1979, abandoned.

[51] Int. Cl.$^3$ ............... C08L 63/00; C08L 65/10
[52] U.S. Cl. ................. 525/512; 525/531; 525/922
[58] Field of Search ................ 525/512, 531

[56] References Cited

U.S. PATENT DOCUMENTS

| 3,066,112 | 11/1962 | Bowen | 260/41 |
| 3,179,623 | 4/1965 | Bowen | 260/47 |
| 3,256,226 | 6/1966 | Fekete | 260/23.5 R |
| 3,301,743 | 1/1967 | Fekete | 161/194 |
| 3,367,992 | 2/1968 | Bearden | 260/37 EP |
| 3,424,699 | 1/1969 | Stark | 525/481 |
| 3,793,359 | 2/1974 | Stapfer | 525/17 |
| 3,956,211 | 5/1976 | Muto | 525/17 |
| 4,131,715 | 12/1978 | Frankel | 525/531 |
| 4,138,385 | 2/1979 | Uffner | 525/17 |

FOREIGN PATENT DOCUMENTS 817001 10/1974 Belgium .

OTHER PUBLICATIONS

Lee et al, Handbook of Epoxy Resins, 1967, pp. 225-226, 23-26.

Primary Examiner—Paul Lieberman

[57] ABSTRACT

Curable compositions which cure into bubble-free articles include as a resinous component, a vinyl ester resin, a ketone peroxide as a catalyst and as a promoter (a) a complex of equivalent amounts of a cobalt salt and an aldimine chelating agent which is the reaction product of equivalent amounts of salicylaldehyde and a polyamine or (b) cobalt naphthenate and about an equivalent amount of aldimine chelating agent which is the reaction product of salicylaldehyde and a polyamine or (c) a combination of (a) and (b).

13 Claims, No Drawings

PROCESS FOR CURING VINYL ESTER RESINS AND COMPOSITION USEFUL THEREIN

CROSS-REFERENCE TO PENDING APPLICATION

This application is a continuation-in-part of our co-pending application U.S. Ser. No. 64,235, filed Aug. 6, 1979 now abandoned.

BACKGROUND OF THE INVENTION

Vinyl ester resins and unsaturated polyesters are known resinous materials finding widespread use in a variety of applications, such as coatings, laminates, moldings, encapsulants, etc. The resins may be employed in filled or unfilled formulations with or without colorants and other additives and with or without reinforcing elements, such as glass or carbon fibers.

Those vinyl ester resins are essentially the product of the reaction of a polyepoxide with an unsaturated monocarboxylic acid to result in a molecule having terminal olefinic unsaturation. The resins alone or with a reactive diluent are polymerized by the addition polymerization of that terminal unsaturation using free radical catalysis techniques. Among the catalysts finding common usage for curing the resins are the various peroxides. Equally common is the use of organometallic promoters with those peroxides. With some combinations of such promoters and peroxides, a gas, essentially oxygen, is generated during the curing process of vinyl ester resins. That gas is entrapped in the resin system leaving the product unattractive and also adversely affecting the properties of the cured product. The problem is manifested particularly with those catalysts that are prepared with hydrogen peroxide which frequently have some residual $H_2O_2$. Also, the problem can occur with those peroxides that generate $H_2O_2$ in a given catalytic combination. The problem is most acute with cobalt salts since they are supplied as a four coordinated compound leaving two potential coordination sites to react with any hydrogen peroxide to produce oxygen.

The problem is not as evident with unsaturated polyesters presumably because maleic acid is a common diacid used in making such resins. Residual maleic acid may be suppressing the foam. That phenomenon is noted in Belgian Pat. No. 817,001.

SUMMARY OF THE INVENTION

Vinyl ester resins are cured using a composition consisting essentially of the resin, a ketone peroxide, and either an organo cobalt salt and an aldimine chelating agent which is the reaction product of salicylaldehyde and an amine or a complex of the organo cobalt salt and the aldimine. The cured product is free of the bubbles or voids that commonly are associated with cures of those resins with a ketone peroxide catalyst and an organo cobalt salt promoter.

DESCRIPTION OF THE INVENTION

Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid. All of the above-described resins, which contain the characteristic linkages

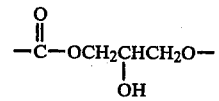

and terminal, polymerizable vinylidene groups, are classified as vinyl ester resins and are incorporated herein by reference.

Briefly, any of the known polyepoxides may be employed in the preparation of the vinyl ester resins useful in this invention. Useful polyepoxides are glycidyl polyethers of both polyhydric alcohols and polyhydric phenols, epoxy novolacs, epoxidized fatty acids or drying oil acids, epoxidized diolefins, epoxidized di-unsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acid, cinnamic acid and the like and mixtures thereof, and hydroxyalkyl acrylate or methacrylate half esters of dicarboxyl acids as described in U.S. Pat. No. 3,367,992 wherein the hydroxyalkyl group preferably has from 2 to 6 carbon atoms.

Preferably, the thermosettable resin phase comprises from 40 to 70 weight percent of the vinyl ester or polyester resin and from 60 to 30 percent of a copolymerizable monomer.

Suitable monomers include vinyl aromatic compounds such as styrene, vinyltoluene, divinylbenzene and the like saturated alcohols such as methyl, ethyl, isopropyl, octyl, etc., esters of acrylic acid or methacrylic acid; vinyl acetate, diallyl maleate, dimethallyl fumarate; mixtures of the same and all other monomers which are capable of copolymerizing with the vinyl ester resin and are essentially water insoluble.

Another embodiment of this invention utilizes a modified vinyl ester resin wherein about 0.1 to 0.6 mole of a dicarboxylic acid anhydride per equivalent of hydroxyl is reacted with the vinyl ester resin. Both saturated and unsaturated acid anhydrides are useful in said modification.

Suitable dicarboxylic acid anhydrides containing ethylenic unsaturation include maleic anhydride, the citraconic anhydride, itaconic anhydride and the like and mixtures thereof. Saturated dicarboxylic acid anhydrides include phthalic anhydride, anhydrides of aliphatic unsaturated dicarboxylic acid and the like. The modified vinyl ester resin is utilized in this invention in the same manner as already described for the unmodified vinyl ester resin.

Many combinations of peroxides and promoters are known for curing vinyl ester resins with or without a reactive monomer included in the curable system. The problem of gas generation appears to be particularly acute with combinations of peroxides containing residual hydrogen peroxide, such as the ketone peroxides, typical of which is methyl ethyl ketone peroxide. The problem is especially bothersome when such peroxides are used with organometallic promoters, such as cobalt naphthenate or cobalt octoate. Such problem systems are commonly preferred because of the ready availability of the materials and the desirable reaction rates achieved therewith.

The aldimine is prepared by condensing salicylaldehyde with an appropriate amine containing at least two amino groups. Typical of useful amines are ethylenediamine, triethylenetetraamine, 1,2-propanediamine, 1,3-propanediamine and orthophenylenediamine. The aldehyde and amine are reacted in about equivalent amounts. Most conveniently a solvent such as methanol is employed.

The complex is prepared by reacting the aldimine with a cobalt salt such as cobalt acetate. It is most convenient to dissolve the aldimine in acetone or similar solvent and slowly add the cobalt salt dissolved in methanol. After addition is complete, the reaction mix is maintained at reflux for about an hour or more. The complex is purified by conventional methods.

The complex can be used as a promoter with ketone peroxides in curing vinyl ester resins, polyester resins or mixtures thereof. The amount of complex to be used is the same amount, based on the cobalt content, as would have been used with the cobalt salt as the promoter as in prior systems. Such amounts will vary depending on the particular peroxide catalyst, the cobalt complex, the resin to be cured and the length of gel and cure times desired. As a general rule, the gel time with a given system will decrease with increasing concentration up to a concentration characteristic of the system after which the gel time will increase with increasing concentration. It is also possible to use small amounts of conventional cabalt salts, such as cobalt naphthenate, as a part of the promoter system along with the Schiff-base cobalt.

Alternatively, similar benefits are realized with a mixture of the cobalt salt, the aldimine curing agent and the catalyst. Also, it is possible to use a blend of the complex and the mixture.

It is sometimes desired to have faster rates of cure than are provided by the catalyst/promoter system of this invention. Such rate increases may be readily achieved by including in the formulations a small amount of an amine, such as N,N-dimethylaniline, as an accelerator. No increase in bubble formation is generally evidenced by such use.

The essential ingredients of the invention may be employed in a number of alternate procedures Alternatively, the resin may be premixed with the cobalt complex of the aldimine and curing initiated with the peroxide when curing is desired or the resin can be premixed with the aldimine and cured by adding the cobalt salt and the peroxide.

The invention will be more apparent from the following examples wherein all parts and percentages are by weight.

EXAMPLE 1

A certain amount of each of several cobalt complexes was mixed with 100 grams of the diacrylate ester of diglycidyl ether of bisphenol A diluted with 45 percent styrene and also containing 1.5 milliliters of methyl ethyl ketone peroxide. In each instance, the amount of complex used was that amount to provide 0.03 gram of cobalt.

The gel time was determined with a Burrel-Castor gelometer and the presence or absence of voids by visual examination. The results are shown in the following table.

TABLE 1

| Amine Used in Making Chelate | Amount of Chelate | Gel Time | Remarks |
|---|---|---|---|
| Ethylenediamine | 0.174 grams | 50 min | no foam |
| Triethylenetetraamine | 0.209 grams | >1 hr | no foam |
| o-phenylenediamine | 0.200 | 18 min | no foam |
| 1,2-propanediamine | 0.182 | >1 hr | no foam |
| 1,3-propanediamine | 0.182 | >1 hr | no foam |
| For Comparison | | | |
| Cobalt naphthenate (no amine) | 0.5 ml | 16 min | foams |

EXAMPLE 2

Compositions similar to those of Example 1 were prepared using standard amounts of methyl ethyl ketone peroxide and as a promoter either (a) cobalt naphthenate and about an equivalent amount of aldimine chelating agent which was the reaction product of salicylaldehyde and a polyamine or (b) the cobalt chelate of the above aldimine. To this composition, a varying amount of N,N-dimethylaniline (DMA) was added. The influence of DMA on the gel time is noted in Table II. These compositions illustrate the advantages realized in reaction rate from use of an accelerator.

TABLE II

| Chelating Agent | Amount of Chelating Agent (gm) | Amount of DMA (gm) | Gel Time (min) | Remarks |
|---|---|---|---|---|
| SAL$^1$—EDA$^2$ | 0.14 | 0.00 | 50.0 | no foam |
| " | 0.14 | 0.263 | 14.6 | " |
| " | 0.14 | 0.16 | 18.3 | " |
| " | 0.14 | 0.105 | 26.0 | " |
| SAL—PDA$^3$ | 0.20 | 0.00 | 54.0 | " |
| " | 0.30 | 0.00 | 50.0 | " |
| " | 0.40 | 0.00 | 48.5 | " |
| " | 1.00 | 0.00 | 47.0 | " |
| " | 0.15 | 0.35 | 20.0 | " |
| " | 0.15 | 0.175 | 33.7 | " |

$^1$SAL = salicylaldehyde
$^2$EDA = ethylenediamine
$^3$PDA = 1,2-propanediamine The effectiveness of the additives in reducing foam was reduced after the compositions of resin and additive were allowed to stand for prolonged periods and the promoter then added to achieve cure.

What is claimed is:

1. In the method for suppressing foam generation during the cure of a vinyl ester resin with a ketone peroxide initiator and a cobalt salt promoter, the improvement wherein said promoter is selected from the group consisting of (a) a complex of equivalent amounts of a cobalt salt and an aldimine chelating agent which is the reaction product of equivalent amounts of salicylaldehyde and a polyamine or (b) cobalt naphthenate and about an equivalent amount of aldimine chelating agent which is the reaction product of salicylaldehyde and a polyamine or (c) a combination of (a) and (b).

2. The method of claim 1 wherein said vinyl ester resin is essentially the diacrylate of the diglycidyl ether of bisphenol A.

3. The method of claim 1 wherein said vinyl ester resin is the polyacrylate of an epoxy novolac.

4. The method of claim 1 wherein said unsaturated monocarboxylic acid is acrylic acid or methacrylic acid.

5. The method of claim 1 wherein said aldimine is the reaction product of salicylaldehyde and ethylenediamine.

6. The method of claim 1 wherein said aldimine is the reaction product of salicylaldehyde and triethylenetetraamine.

7. The method of claim 1 wherein said aldimine is the reaction product of salicylaldehyde and o-phenylenediamine.

8. The method of claim 1 wherein said aldimine is the reaction product of salicylaldehyde and 1,2-propanediamine.

9. The method of claim 1 wherein said aldimine is the reaction product of salicylaldehyde and 1,3-propanediamine.

10. The method of claim 1 wherein said cobalt salt is cobalt acetate.

11. The method of claim 1 wherein said cobalt salt is cobalt naphthenate.

12. The method of claim 1 also containing a monounsaturated monomer as a reactive diluent.

13. The method of claim 12 wherein said monounsaturated monomer is styrene.

* * * * *